(12) United States Patent
Kim et al.

(10) Patent No.: US 10,116,424 B2
(45) Date of Patent: Oct. 30, 2018

(54) METHOD AND APPARATUS FOR TRANSMITTING AND RECEIVING DATA

(71) Applicant: SAMSUNG ELECTRONICS CO., LTD., Suwon-si (KR)

(72) Inventors: Jae-han Kim, Suwon-si (KR); Hyeon-mok Ko, Hwaseong-si (KR); Dae-hyung Kwon, Seoul (KR); Kill-yeon Kim, Suwon-si (KR); Mun-hwan Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/838,494

(22) Filed: Aug. 28, 2015

(65) Prior Publication Data

US 2016/0066309 A1 Mar. 3, 2016

Related U.S. Application Data

(60) Provisional application No. 62/043,607, filed on Aug. 29, 2014.

(30) Foreign Application Priority Data

May 6, 2015 (KR) .................. 10-2015-0063225

(51) Int. Cl.
*H04J 3/24* (2006.01)
*H04L 5/00* (2006.01)
(Continued)

(52) U.S. Cl.
CPC ............. *H04L 5/0055* (2013.01); *H04L 1/00* (2013.01); *H04L 47/283* (2013.01); *H04W 4/70* (2018.02)

(58) Field of Classification Search
CPC .................................... H04L 5/0055
See application file for complete search history.

(56) References Cited

U.S. PATENT DOCUMENTS 5,828,677 A 10/1998 Sayeed et al.
6,145,109 A * 11/2000 Schuster ............. H03M 13/373
714/752

(Continued)

FOREIGN PATENT DOCUMENTS

| EP | 1583270 A1 | 10/2005 |
| WO | 0021236 A1 | 4/2000 |
| WO | 2004075023 A2 | 9/2004 |

OTHER PUBLICATIONS

Communication (PCT/ISA/210 & PCT/ISA/237) dated Dec. 11, 2015, issued by the International Searching Authority in counterpart International Application No. PCT/KR2015/009083.

(Continued)

*Primary Examiner* — Gerald A Smarth
(74) *Attorney, Agent, or Firm* — Sughrue Mion, PLLC

(57) ABSTRACT

Provided is a technology related to a sensor network, machine to machine (M2M), machine type communication (MTC), and the Internet of things (IoT). Transmitting data between transceivers including transmitting data segments of source data and parity data segments including restoration information for a transceiver to restore the source data. The method is applicable to intelligent services based on the technology (e.g., smart home services, smart building services, smart city services, smart or connected car services, health care services, digital education services, retail business services, security and safety-related services, etc.).

23 Claims, 16 Drawing Sheets

(51) Int. Cl.
  *H04L 12/841* (2013.01)
  *H04L 1/00* (2006.01)
  *H04W 4/70* (2018.01)

(56) References Cited

U.S. PATENT DOCUMENTS

| | | | |
|---|---|---|---|
| 6,651,130 B1* | 11/2003 | Thibault | G06F 3/0614 |
| | | | 710/29 |
| 6,785,261 B1* | 8/2004 | Schuster | H04L 29/06027 |
| | | | 370/352 |
| 6,829,670 B1* | 12/2004 | Nakamura | G06F 13/4059 |
| | | | 370/235 |
| 2003/0002502 A1 | 1/2003 | Gibson et al. | |
| 2003/0226071 A1 | 12/2003 | Millar | |
| 2004/0153909 A1 | 8/2004 | Lim et al. | |
| 2006/0212775 A1 | 9/2006 | Cypher | |
| 2009/0249164 A1 | 10/2009 | Hammer | |
| 2011/0219279 A1* | 9/2011 | Abu-Surra | H03M 13/2707 |
| | | | 714/746 |
| 2012/0155474 A1* | 6/2012 | Kessler | H04L 49/3072 |
| | | | 370/393 |
| 2012/0203893 A1* | 8/2012 | Williams | H04L 69/163 |
| | | | 709/224 |
| 2013/0044835 A1 | 2/2013 | Sevin et al. | |

OTHER PUBLICATIONS

Communication dated Mar. 15, 2018, issued by the European Patent Office in counterpart European Application No. 15836559.3.

\* cited by examiner

FIG. 11A
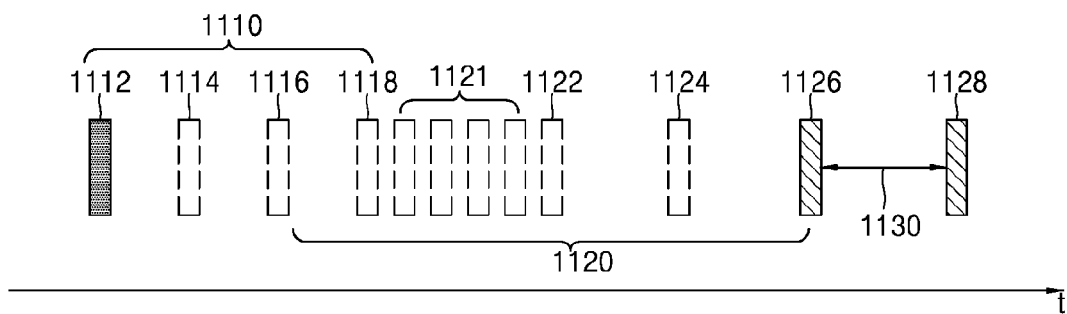
FIG. 11B
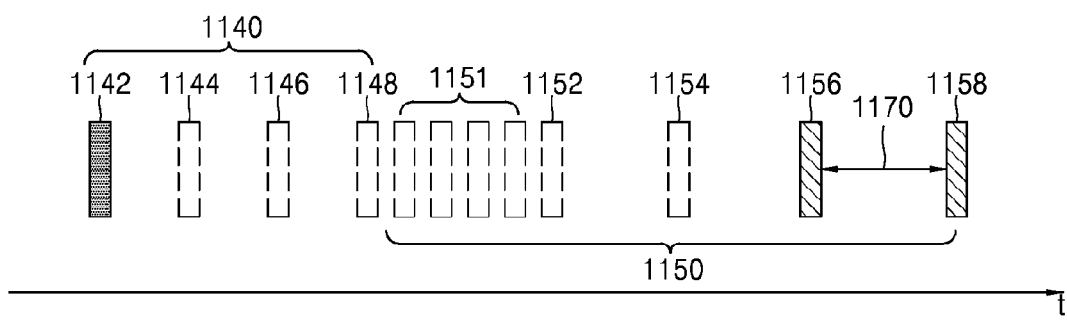
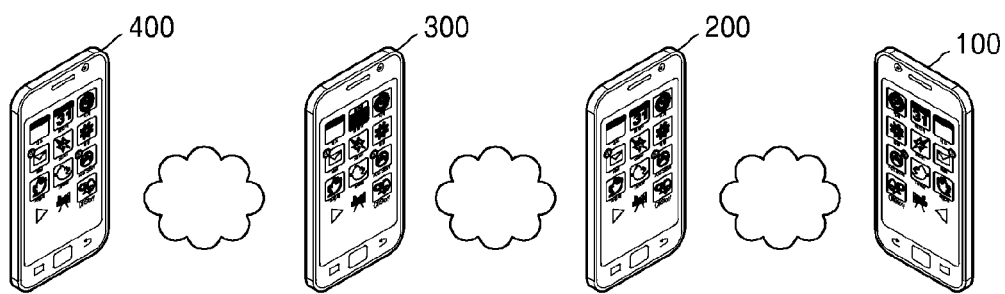

METHOD AND APPARATUS FOR TRANSMITTING AND RECEIVING DATA

CROSS-REFERENCE TO RELATED APPLICATIONS

This application claims the benefit of U.S. Provisional Application No. 62/043,607, filed on Aug. 29, 2014, in the US Patent Office, and claims the benefit of Korean Patent Application No. 10-2015-0063225, filed on May 6, 2015, in the Korean Intellectual Property Office, the disclosures of which are incorporated herein by reference in their entireties.

BACKGROUND

1. Field

Methods and apparatuses consistent with exemplary embodiments relate to a method of transmitting and receiving data by using a first transceiver and a second transceiver, and a recording medium having recorded thereon a program for executing a method of transmitting and receiving data.

2. Description of the Related Art

The Internet has evolved from a human-centered network via which humans create and consume information to the Internet of Things (IoT) via which information is exchanged and processed among distributed components such as objects. Thus, much attention has been paid to the Internet of Everything (IoE) technology that is a combination of a technology of processing big data by accessing a cloud server and IoT technology. For the IoT, technologies, such as sensing technology, a wire/wireless communication and network infrastructure, service interface technology, and security technology are required. Therefore, research has recently been conducted on technologies for connecting objects, such as a sensor network, machine-to-machine (M2M), machine type communication (MTC), etc.

In an IoT environment, data generated by objects connected to each other may be collected and analyzed to provide an intelligent Internet technology service for creating a new value for human life. Through the IoT, the existing information technologies may be fused or combined with various industrial technologies, and applied to the fields of smart homes, smart buildings, smart cities, smart cars or connected cars, smart grids, health care, smart home appliances, advanced medical services, etc.

SUMMARY

Aspects of the exemplary embodiments relate to methods and apparatuses for exchanging data between a first transceiver and a second transceiver by providing control information for obtaining the data from the second transceiver to the first transceiver, thereby more efficiently using resources required to transmit and receive the data based on the control information.

Additional aspects will be set forth in part in the description which follows and, in part, will be apparent from the description, or may be learned by practice of the presented exemplary embodiments.

According to an aspect of an exemplary embodiment, a method of transmitting data, performed by a first transceiver, includes transmitting data segments of source data and parity data segments comprising restoration information for restoring the source data, to a second transceiver; receiving from the second transceiver a control signal representing whether the source data is obtained by the second transceiver, based on at least one data segment among the source data segments and the parity data segments; determining that additional data segments for the second transceiver to obtain the source data are to be transmitted, based on the control signal; and transmitting the additional data segments to the second receiver.

According to an exemplary embodiment, a point of time at which a parity data set including a plurality of parity data segments is to be transmitted may be determined to be a point of time after a data round-trip time between the first transceiver and the second transceiver, starting from a point of time at which the transmitting of the source data is completed.

According to an exemplary embodiment, a control signal may include information representing whether the source data is obtained, and the receiving of the control signal may include receiving, from the second transceiver, a request to provide the additional data segments for obtaining the source data. The method may further include transmitting the additional data segments according to the received request.

According to an exemplary embodiment, the receiving of the control signal may include receiving, from the second transceiver, information regarding a quantity of the additional data segments for obtaining the source data. The method may further include transmitting the additional data segments, based on the information regarding the quantity of the additional data segments.

According to an exemplary embodiment, the method may further include receiving information indicating a data loss section predicted by the second transceiver based on the at least one data segment, from the second transceiver; and changing a transmission section in which the additional data segments are transmitted, based on the information indicating the predicted data loss section.

According to an exemplary embodiment, when it is determined based on the control signal that the source data is obtained by the second transceiver, the method may further include discontinuing the transmitting of the additional data segments.

According to an aspect of another exemplary embodiment, a method of transmitting and receiving data, performed by a receiving transceiver, includes receiving at least one data segment among data segments of source data and parity data segments including restoration information for restoring the source data, from a transmitting transceiver; determining that the source data is not obtained by the transmitting transceiver, based on the received at least one data segment; and transmitting a control signal indicating that the source data is not obtained, to the transmitting transceiver, based on a result of the determining.

The method may further include identifying the received at least one data segment; predicting a quantity of parity data segments to be received after the identified at least one data segment; and comparing the predicted quantity of the parity data segments and a quantity of the received at least one data segment with a quantity of data segments required to obtain the source data. The transmitting of the control signal may include requesting additional data segments for obtaining the source data, based on a result of the comparing, to the transmitting transceiver.

According to an exemplary embodiment, the requesting of the additional data segments may include obtaining information indicating the quantity of the additional data segments required to obtain the source data.

According to an exemplary embodiment, the method may further include predicting a point of time at which the parity data segments are to be received, based on identification information of the received at least one data segment and a point of time at which the received at least one data segment is received. When the parity data segments are not received at the predicted point of time, the transmitting of the control signal may include requesting additional data segments for obtaining the source data.

According to an exemplary embodiment, the method may further include predicting a data loss section, based on information regarding a point of time at which the received at least one data segment is received; and transmitting information regarding the predicted data loss section to the first transceiver. A transmission section in which additional data segments for obtaining the source data are transmitted may be determined based on the information regarding the predicted data loss section.

According to an aspect of another exemplary embodiment, a first transceiver for transmitting and receiving data includes a transmission unit configured to transmit source data segments included in source data and parity data segments comprising restoration information for restoring the source data, to a second transceiver; a receiving unit configured to receive from the second transceiver a control signal representing whether the source data is obtained, based on at least one data segment among the source data segments and the parity data segments; and a data transmission controller configured to determine that additional data segments for the second transceiver to obtain the source data are to be transmitted, based on the control signal and control the transmission unit to transmit the additional data segments to the second receiver.

According to an exemplary embodiment, a point of time at which a parity data set including a plurality of parity data segments is to be transmitted may be determined after a data round-trip time between the first transceiver and the second transceiver, starting from a point of time at which the transmission of the source data is completed.

According to an exemplary embodiment, the control signal may include information representing whether the second transceiver obtains the source data, the receiving unit may receive a request to provide the additional data segments for obtaining the source data from the second transceiver, and the transmission unit may transmit the additional data segments according to the request.

According to an exemplary embodiment, the receiving unit may receive information regarding a quantity of the additional data segments for the second transceiver to obtain the source data, from the second transceiver, and the transmission unit may transmit the additional data segments, based on the information regarding the quantity of the additional data segments.

According to an exemplary embodiment, the receiving unit may receive information indicating a data loss section predicted based on the at least one data segment from the second transceiver, and the data transmission controller may change a transmission section in which the additional data segments are transmitted, based on the information regarding the predicted data loss section.

According to an exemplary embodiment, when it is determined based on the control signal that the source data is obtained by the second transceiver, the data transmission controller may discontinue transmitting the additional data segments.

According to an aspect of another exemplary embodiment, receiving transceiver for transmitting and receiving data includes a receiving unit configured to receive at least one data segment among data segments of source data and parity data segments comprising restoration information for restoring the source data, from a transmitting transceiver, a data obtaining controller configured to determine that the source data is not obtained by the transmitting transceiver, based on the received at least one data segment; and a transmission unit configured to transmit a control signal indicating that the source data is not obtained, to the transmitting transceiver, based on a result of the determining.

According to an exemplary embodiment, the data obtaining controller may identify the received at least one data segment, predict a quantity of parity data segments to be received after the identified at least one data segment, and compare a quantity of the predicted parity data segments and a quantity of the received at least one data segment with a quantity of data segments required to obtain the source data, and the transmission unit may request the required additional data segments, based on a result of comparing the quantity of the predicted parity data segments and the quantity of the received at least one data segment with the quantity of the required data segments.

According to an exemplary embodiment, wherein the requesting of the additional data segment may include obtaining information indicating the required additional data segments.

According to an exemplary embodiment, the data obtaining controller may predict a point of time at which the parity data segments are to be received, based on identification information of the received at least one source data segment and a point of time at which the received at least one data segment is received, and the transmission unit may request the additional data segments for obtaining the source data when the parity data segments are not received at the predicted point of time.

According to an exemplary embodiment, the data obtaining controller may predict a data loss section, based on a point of time at which the received at least one data segment is received, the transmission unit may transmit information regarding the predicted data loss section to the transmitting transceiver, and a transmission section in which additional data segments for obtaining the source data are transmitted may be determined based on the information indicating the predicted data loss section.

BRIEF DESCRIPTION OF THE DRAWINGS

The above and/or other aspects will become apparent and more readily appreciated from the following description of the exemplary embodiments, taken in conjunction with the accompanying drawings in which:

FIGS. 11A-B are diagrams illustrating a method of changing a segment data transmission section in which data segments are transmitted by receiving information regarding a data loss section from a second transceiver, the method performed by a first transceiver, according to an exemplary embodiment;

DETAILED DESCRIPTION

Figure 1:
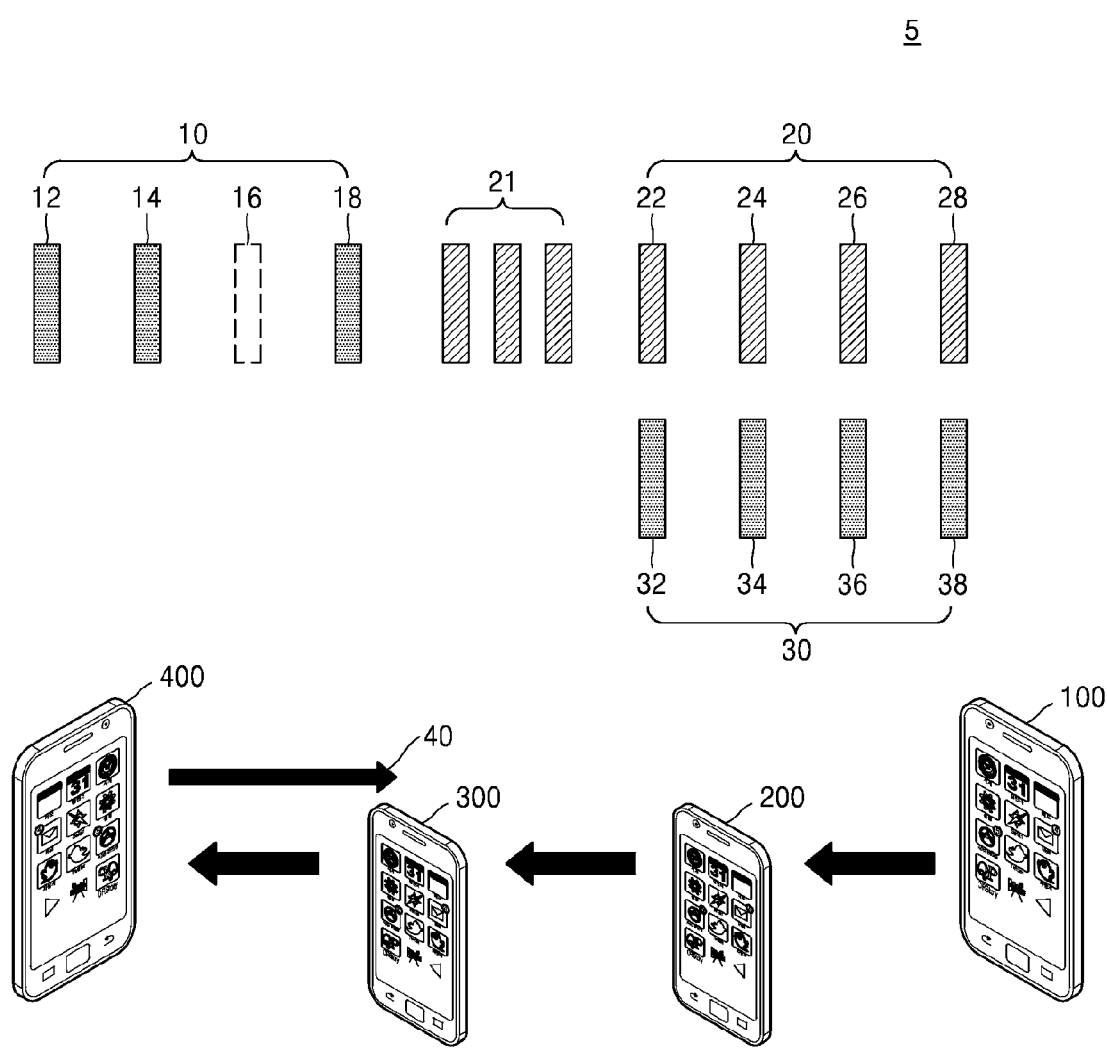
FIG. 1 is a conceptual diagram illustrating a data transmitting and receiving system according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects.

Before exemplary embodiments are described in detail, the terminology used in the present disclosure will be briefly described.

In the present disclosure, general terms that have been widely used nowadays are selected, if possible, in consideration of functions of the inventive concept, but non-general terms may be selected according to the intentions of technicians in the art, precedents, or new technologies, etc. Also, some terms may be arbitrarily chosen by the present applicant. In this case, the meanings of these terms will be explained in corresponding parts of the present disclosure in detail. Thus, the terms used herein should be defined not based on the names thereof but based on the meanings thereof and the whole context of the inventive concept.

It will be understood that the terms "comprise" and/or "comprising" when used in this specification, specify the presence of stated features, integers, steps, operations, elements, and/or components, but do not preclude the presence or addition of one or more other features, integers, steps, operations, elements, components, and/or groups thereof. Also, the terms "unit", "module", etc. mean units for processing at least one function or operation and may be embodied as hardware, software, or a combination thereof.

Hereinafter, various exemplary embodiments will be described in detail with reference to the accompanying drawings so that those of ordinary skill in the art may easily accomplish them. However, an exemplary embodiment may be embodied in many different forms and the inventive concept is not limited to exemplary embodiments set forth herein. For clarity, elements that are not related to these exemplary embodiments are omitted in the drawings. Like reference numerals denote like elements throughout the specification.

As used herein, the term "and/or" includes any and all combinations of one or more of the associated listed items. Expressions such as "at least one of," when preceding a list of elements, modify the entire list of elements and do not modify the individual elements of the list.

FIG. 1 is a conceptual diagram illustrating a data transmitting and receiving system 5 (hereinafter referred to as 'the system 5') according to an exemplary embodiment;

Referring to FIG. 1, the system 5 may include a first transceiver 100, a first relay device 200, a second relay device 300, and a second transceiver 400.

FIG. 1 illustrates only components of the system 5 related to the present exemplary embodiment, but those of ordinary skill will understand that the system 5 may further include other general components. For example, the system 5 of FIG. 1 may further include any quantity of relay devices, in addition to the first transceiver 100, the first relay device 200, the second relay device 300, and the second transceiver 400.

The first transceiver 100 and the second transceiver 400 are computing devices having data processing capability and capability to perform wire or wireless communication with other devices. The first transceiver 100 and the second transceiver 400 exchange data 10, 20, and 30 with each other via at least one among the first and second relay devices 200 and 300. For example, the first transceiver 100 may transmit the data 10, 20, and 30 to the first relay device 200. The first relay device 200 may relay the data 10, 20, and 30 received from the first transceiver 100 to the second relay device 300. The second relay device 300 may relay the data 10, 20, and 30 received from the first relay device 200 to the second transceiver 400.

The data 10, 20, and 30 transmitted from the first transceiver 100 may include source data (e.g., the data 10), and parity data (e.g., the data 20) including restoration information for the source data. For example, the first parity data 20 may include restoration information for the first source data 10. Here, the first parity data 20 may be obtained using error correction algorithms that have been used to obtain source data (e.g., the data 10).

Also, the data 10, 20, and 30 may include data segments having a preset size (e.g., data segments 12, 22, and 32). For example, the first source data 10 may include a first-first source data segment 12, a first-second source data segment 14, a first-third source data segment 16, and a first-fourth source data segment 18.

The second source data 30 may include a second-first source data segment 32, a second-second source data segment 34, a second-third source data segment 36, and a second-fourth source data segment 38. The first parity data 20 may include a first-first parity data segment 22, a first-second parity data segment 24, a first-third parity data segment 26, and a first-fourth parity data segment 28.

According to an exemplary embodiment, the first transceiver 100 may combine parity segments 21 and the first parity data segments 22, 24, 26, and 28 included in the first parity data 20 with the second source data segments 32, 34, 36, and 38 included in the second source data 30, and transmit a result of combining these parity segments with these second source data segments to the second transceiver 400. However, exemplary embodiments are not limited thereto.

In a wireless network environment, a data segment, e.g., the first-third source data segment 16, may be lost due to a change in a routing path, channel interference, etc. For example, the first-third source data segment 16 included in the first source data 10 transmitted from the first transceiver 100 to the second transceiver 400 may be lost.

According to an exemplary embodiment, the second transceiver 400 may determine whether the first source data 10 is obtained, based on at least one received data segment, for example, among the data segments 12, 14, 18, 22. Also, the second transceiver 400 may transmit a control signal 40 representing whether the first source data 10 is obtained, to the first transceiver 100 that transmits the first source data 10, based on a result of determining whether the first source data 10 is obtained.

According to an exemplary embodiment, the control signal 40 may include information regarding the quantity of data segments required for the second transceiver 400 to obtain the first source data 10. Also, the control signal 40 may include information regarding a data loss period predicted based on the at least one data segment received by the second transceiver 400 among the data segments 12, 14, 18, and 22.

According to an exemplary embodiment, the first transceiver 100 may determine whether additional data segments for obtaining the first source data 10 are to be transmitted, based on the received control signal 40. The first transceiver 100 may discontinue transmitting the additional data segment, when it is determined based on the control signal 40 that the second transceiver 400 obtains the first source data 10. When the second transceiver 400 obtains the first source data 10, the first transceiver 100 may discontinue transmitting the additional data segment, thereby efficiently using resources for transmitting and receiving data.

According to another exemplary embodiment, the control signal 40 may be transmitted from the second transceiver 400 to the first transceiver 100 via a relay device other than the first relay device 200 and the second relay device 300.

Figure 2:
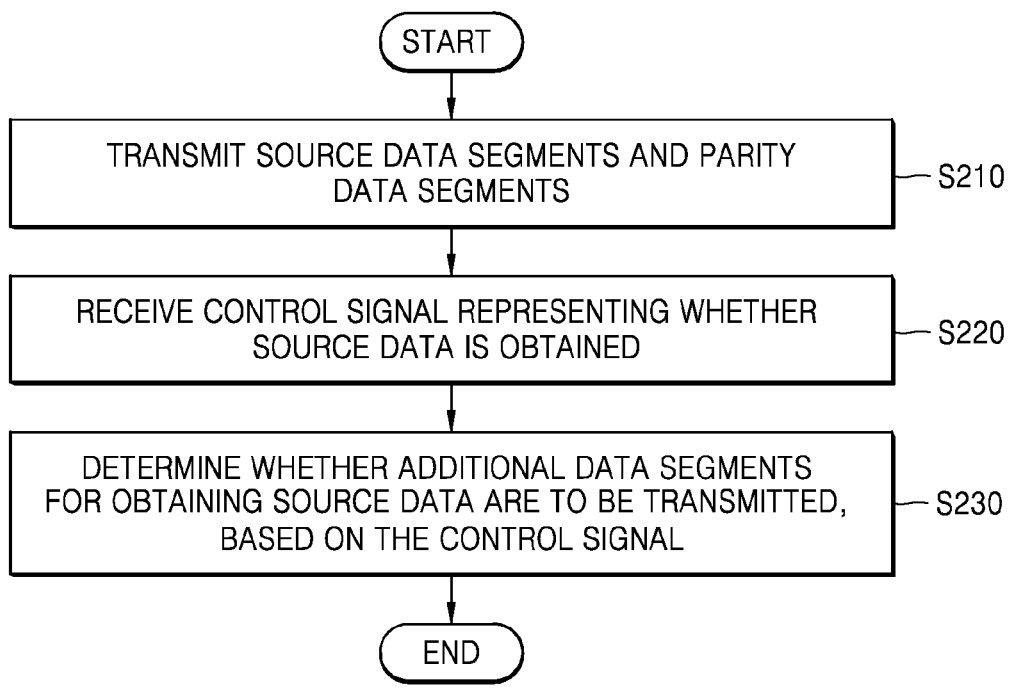
FIG. 2 is a flowchart of transmitting and receiving data, by using a first transceiver, according to an exemplary embodiment.

FIG. 2 is a flowchart of transmitting and receiving data, by using the first transceiver 100 of FIG. 1, according to an exemplary embodiment.

Referring to FIGS. 1 and 2, in operation S210, the first transceiver 100 transmits source data segments included in source data and parity data segments including restoration information for the source data to the second transceiver 400.

According to an exemplary embodiment, the first transceiver 100 may obtain a preset quantity of source data segments and a preset quantity of parity data segments. For example, when the first transceiver 100 employs forward error correction (FEC), the first transceiver 100 may generate a data block including k source data segments and (n–k) parity data segments.

According to an exemplary embodiment, the source data segments and the parity data segments included in the data block may be transmitted to the second transceiver 100 in units of segments.

The first transceiver 100 may transmit at least one source data segment included in the data block to the second transceiver 400. Here, the at least one source data segment may be unit data obtained by dividing the source data according to time or a data size.

Also, according to an exemplary embodiment, the first transceiver 100 may transmit at least one parity data segment to the second transceiver 400. The first transceiver 100 may transmit parity data to the second transceiver 400 according to at least one of a burst transmission method and a distributed transmission method. In the burst transmission method, the first transceiver 100 transmits the parity data to the second transceiver 400 as soon as the parity data is generated. In the distributed transmission method, parity data generated by the first transceiver 100 is transmitted to the second transceiver 400 at predetermined time intervals.

In operation S220, the first transceiver 100 receives from the second transceiver 400 a control signal 40 representing whether the source data is obtained, the control signal 40 determined based on at least one data segment among the source data segments and the parity data segments. The control signal 40 may include information indicating whether the second transceiver 400 obtains the source data.

According to an exemplary embodiment, the first transceiver 100 may receive an acknowledgement (ACK) signal from the second transceiver 400 when the second transceiver 400 receives the source data based on the received at least one data segment.

In contrast, the first transceiver 100 may receive a negative-acknowledgement (NACK) signal from the second transceiver 400 when the second transceiver 400 does not receive the source data based on the received at least one data segment. Also, when the second transceiver 400 cannot obtain the source data, the first transceiver 100 may receive information regarding the quantity of additional data segments required to obtain the source data.

According to an exemplary embodiment, the first transceiver 100 may receive information regarding a data loss section in which the source data is damaged from the second transceiver 400, as will be described in detail with reference to FIG. 13.

In operation S230, the first transceiver 100 determines whether additional data segments for obtaining the source data are to be transmitted, based on the control signal 40.

According to an exemplary embodiment, when receiving the ACK signal from the second transceiver 400, the first transceiver 100 may not transmit the additional data segments.

According to an exemplary embodiment, when receiving the NACK signal from the second transceiver 400, the first transceiver 100 may transmit the additional data segments to the second transceiver 400. The additional data segments may include at least one among the source data segments that constitute the source data and the parity data segments that constitute the parity data.

According to an exemplary embodiment, the first transceiver 100 may transmit additional data segments to the second transceiver 400, based on information regarding the quantity of additional data segments required to obtain the source data, the information received from the second transceiver 400. Also, the first transceiver 100 may change the size of a data block, based on the information regarding the quantity of the additional data segments required to obtain the source data, the information received from the second transceiver 400. For example, the first transceiver 100 changes the size of a data block including k source data segments and (n−k) parity data segments by adding parity data segments to the data block.

Figure 3:
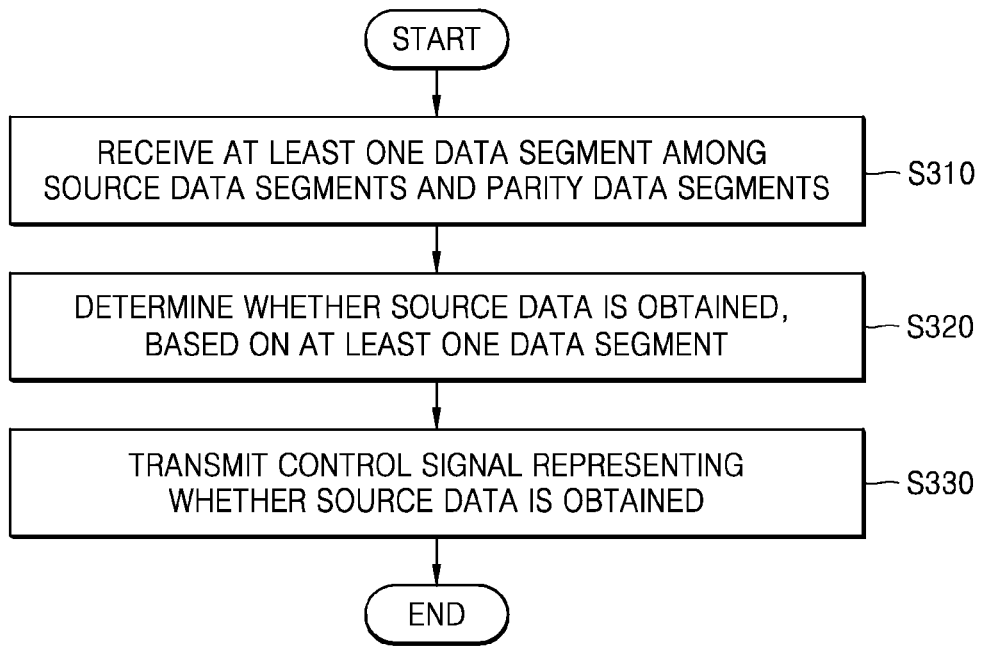
FIG. 3 is a flowchart of transmitting and receiving data, by using a second transceiver, according to an exemplary embodiment.

FIG. 3 is a flowchart of transmitting and receiving data, by using a second transceiver 400, according to an exemplary embodiment.

Referring to FIGS. 1 and 3, in operation S310, the second transceiver 400 receives from the first transceiver 100 at least one data segment among source data segments included in source data and parity data segments including restoration information for the source data.

Some data segments among the at least one data segment transmitted from the first transceiver 100 to the second transceiver 400 may be lost due to a change in a network environment, e.g., a change in a routing path or channel interference.

The second transceiver 400 may receive at least some of the at least one source data segment transmitted from the first transceiver 100. Also, the second transceiver 400 may receive at least some of at least one parity data segment transmitted from the first transceiver 100.

In operation S320, the second transceiver 400 determines whether the source data is obtained, based on the received at least one data segment.

According to an exemplary embodiment, the second transceiver 400 may compare the quantity of the received at least one data segment with the quantity of data segments required to obtain the source data. For example, the second transceiver 400 may determine that the source data may be obtained when the quantity of the received at least one data segment is greater than or equal to the quantity of data segments required to obtain the source data.

However, a method of determining whether the source data is obtained, based on the received at least one data segment, the method performed by the second transceiver 400, is not limited thereto.

In operation S330, the second transceiver 400 transmits a control signal representing whether the source data is obtained, to the first transceiver 100 that transmits the source data, based on the result of determining whether the source data is obtained.

According to an exemplary embodiment, when the source data is obtained from the received at least one data segment, the second transceiver 400 may transmit an ACK signal to the first transceiver 100. When the source data is not obtained from the received at least one data segment, the second transceiver 400 may transmit a NACK signal to the first transceiver 100. When the source data is not obtained from the received at least one data segment, the second transceiver 400 may transmit, as a control signal, information regarding the quantity of additional data segments for obtaining the source data to the first transceiver 100.

According to another exemplary embodiment, the second transceiver 400 may predict a data loss section, based on an identification (ID), for example an ID number, of the at least one data segment and a point of time at which the at least one data segment is received. The second transceiver 400 may transmit information regarding the predicted data loss section to the first transceiver 100, as will be described in detail with reference to FIG. 12 below.

Figure 4:
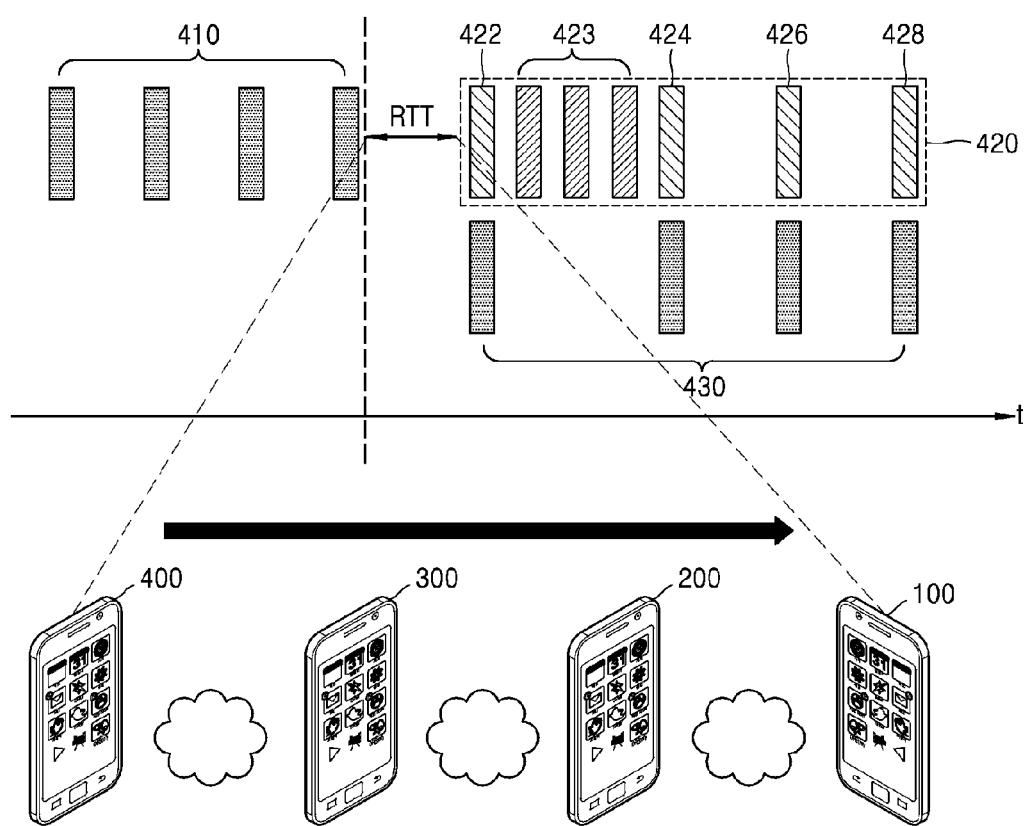
FIG. 4 is a diagram illustrating a method of determining a point of time when parity data is to be transmitted to a second transceiver, the method performed by a first transceiver, according to an exemplary embodiment.

FIG. 4 is a diagram illustrating a method of determining a point of time when parity data is to be transmitted to a second transceiver 400, the method performed by a first transceiver 100, according to an exemplary embodiment The first transceiver 100 may transmit first source data 410 to the second transceiver 400 which is a transmission destination according to a multi-hop method. For example, the first source data 410 may be transmitted from the first transceiver 100 to the second transceiver 400 via a first relay device 200 and a second relay device 300.

The first transceiver 100 may generate first parity data 420 including restoration information for the first source data 410. After transmitting the first source data 410, the first transceiver 100 may transmit the first parity data 420 to the second transceiver 400.

According to an exemplary embodiment, the first transceiver 100 may transmit the first parity data 420 after a data round-trip time between the first transceiver 100 and the second transceiver 400, starting from a point of time at which the transmission of the first source data 410 is ended. The first transceiver 100 may not transmit the first parity data 420 within the data round-trip time during which an ACK signal may arrive to the first transceiver 100 from the second transceiver 400, thereby allowing the first source data 410 to be received by the second transceiver 400 while preventing the first parity data 420 from being received by the second transceiver 400.

The first parity data 420 may be also transmitted from the first transceiver 410 to the second transceiver 400 according to the multi-hop method.

The first parity data 420 generated by the first transceiver 100 may include a first burst parity data set 423 transmitted according to the burst transmission method, and first distributed parity data segments 422, 424, 426, and 428 transmitted according to the distributed transmission method. The first burst parity data set 423 may include a plurality of parity data segments.

Referring to FIG. 4, the second transceiver 400 may receive all of source data segments included in the first source data 410. When the second transceiver 400 receives all of the source data segments included in the first source data 410, the second transceiver 400 may transmit an ACK signal indicating that the first source data 410 is obtained, to the first transceiver 100.

When receiving the ACK signal from the second transceiver 400, the first transceiver 100 may not transmit the second parity data 420.

According to another exemplary embodiment, when the first transceiver 100 does not receive the ACK signal from or receives a NACK signal from the second transceiver 400, the first transceiver 100 may transmit a combination of the first parity data 420 and the second source data 430 to the second transceiver 400. However, exemplary embodiments are not limited thereto, and the first transceiver 100 may transmit the first parity data 420 and the second source data 430 separately to the second transceiver 400, FIG. 5 is a flowchart of a method of determining a point of time when parity data is to be transmitted to a second transceiver, the method performed by a first transceiver, according to an exemplary embodiment.

Figure 5:
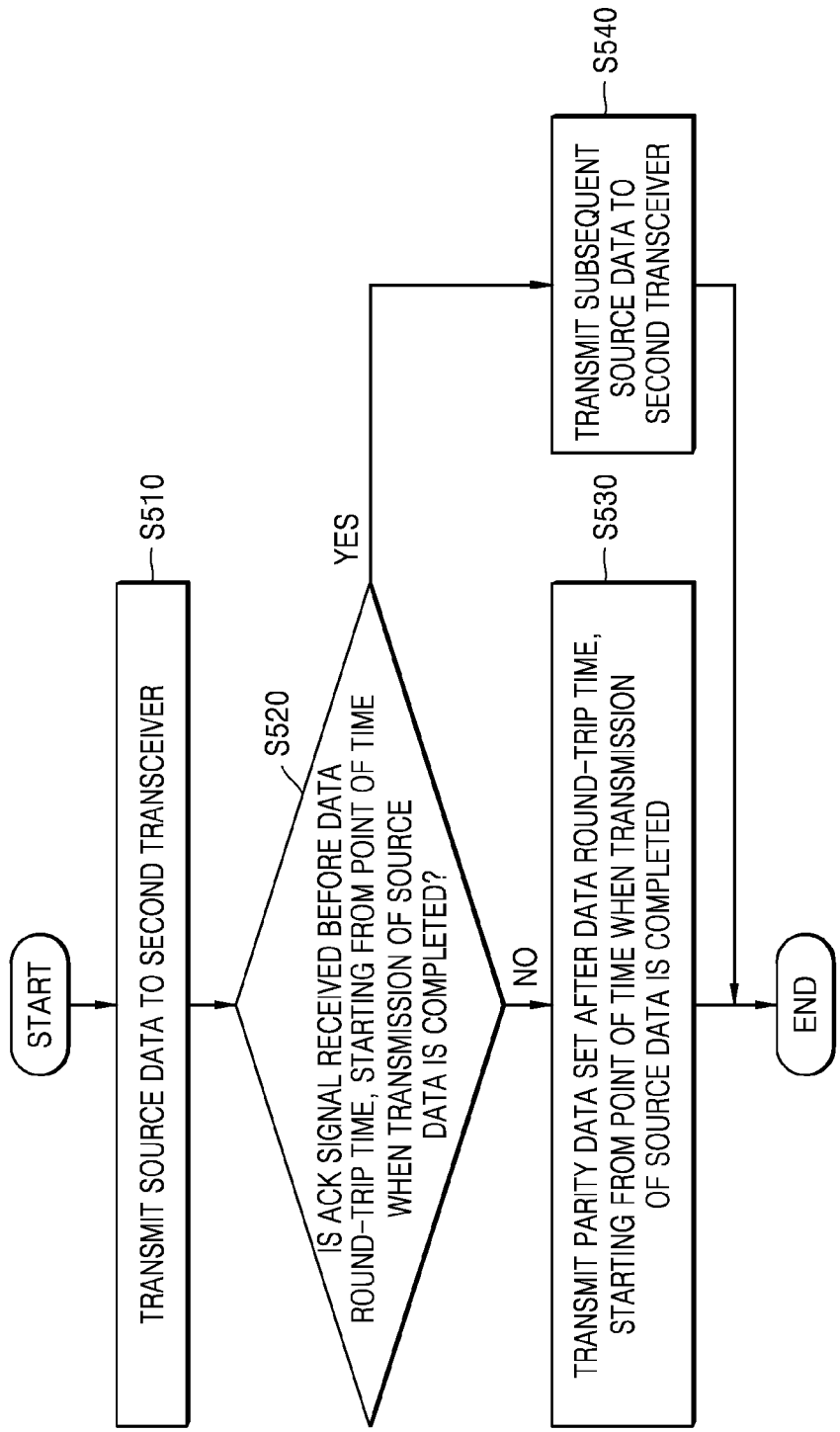
FIG. 5 is a flowchart of a method of determining a point of time when parity data is to be transmitted to a second transceiver, the method performed by a transmission device, according to an exemplary embodiment.

Referring to FIGS. 1 and 5, in operation S510, the first transceiver 100 may transmit source data to the second transceiver 400. Here, the first transceiver 100 may transmit the source data to the second transceiver 400 according to the multi-hop method via at least one relay device among the relay devices 200 and 300.

In operation S520, the first transceiver 100 may determine whether an ACK signal is received before a data round-trip time between the first transceiver 100 and the second transceiver 400, starting from a point of time at which the transmission of the source data is completed. Here, the ACK signal may be transmitted from the second transceiver 400 to the first transceiver 100 when the second transceiver 400 receives the source data.

In operation S530, the first transceiver 100 may transmit a parity data set including a plurality of parity data segments to the second transceiver 400 after the data round-trip time, starting from the point of time at which the transmission of the source data is completed.

According to an exemplary embodiment, the first transceiver 100 may change a point of time at which the parity data set is to be transmitted to the second transceiver 400 to be a point of time after the data round-trip time, starting from the point of time at which the transmission of the source data is completed. The first transceiver 100 may transmit the parity data set after a point of time at which the ACK signal may be received from the second transceiver 400, so that the parity data set may be transmitted to the second transceiver 400 after determining whether the second transceiver 400 obtains the source data.

In operation S540, the first transceiver 100 may transmit subsequent source data to the second transceiver 400.

According to an exemplary embodiment, when the first transceiver 100 receives the ACK signal before the data round-trip time, starting from the point of time at which the transmission of the source data is completed, the first transceiver 100 may transmit the subsequent source data to the second transceiver 400.

The first transceiver 100 may transmit the subsequent source data to the second transceiver 400 according to the ACK signal received from the second transceiver 400 without transmitting the parity data of the completely transmitted source data to the second transceiver 400, thereby efficiently using network resources.

Figure 6:
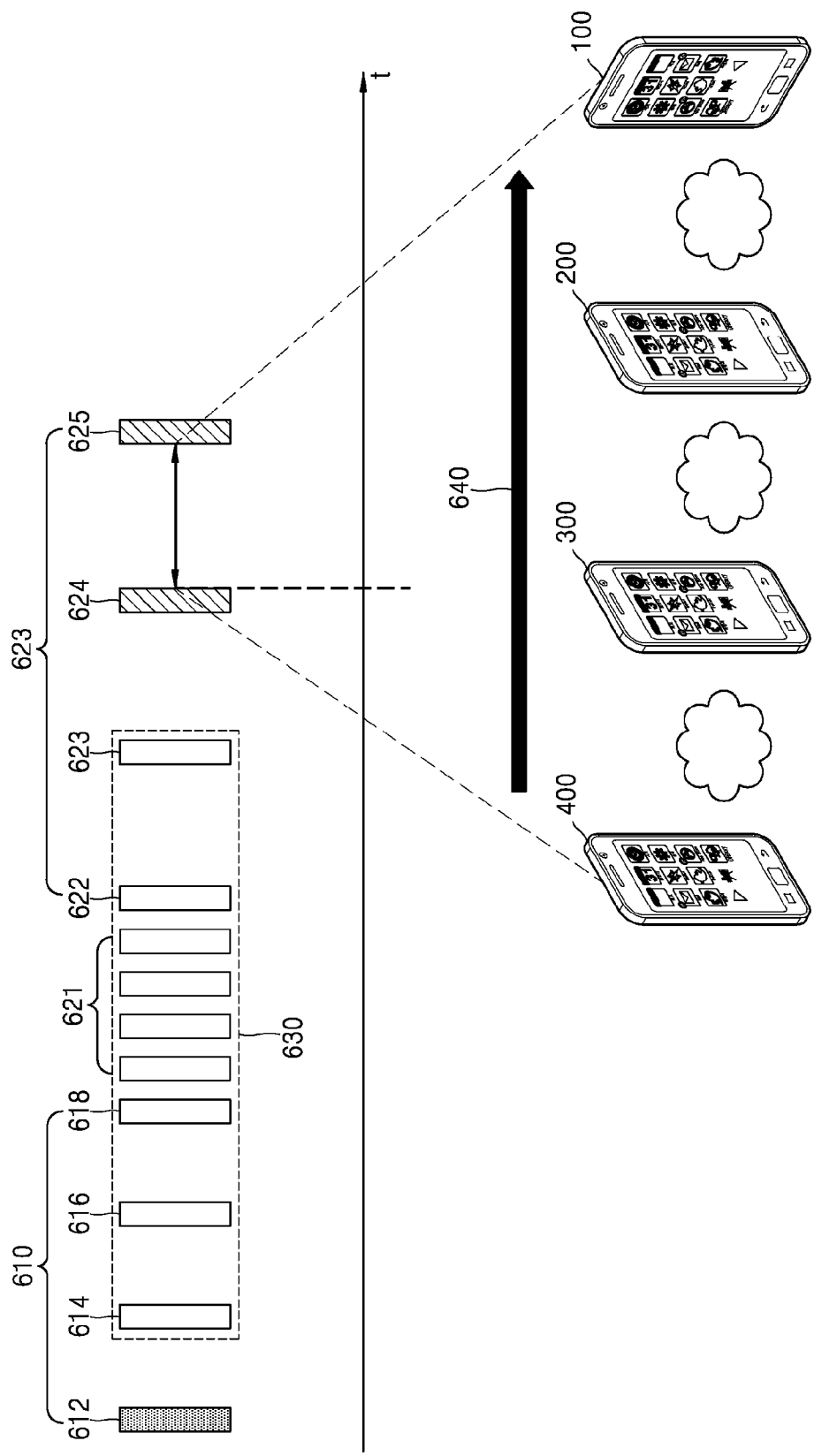
FIG. 6 is a diagram illustrating a method of transmitting additional data segments from a transmission device to a second transceiver when the transmission device receives a negative-acknowledgement (NACK) signal from the second transceiver according to an exemplary embodiment.

FIG. 6 is a diagram illustrating a method of transmitting additional data segments from a first transceiver 100 to a second transceiver 400 when the first transceiver 100 receives a NACK signal from the second transceiver 400 according to an exemplary embodiment.

Referring to FIG. 6, the first transceiver 100 may transmit first source data 610 to the second transceiver 400 via relay devices 200 and 300 according to the multi-hop method. For example, the first source data 610 may be transmitted from the first transceiver 100 to the second transceiver 400 via the first relay device 200 and the second relay device 300. The first source data 610 may include a plurality of first source data segments 612, 614, 616, and 618.

The first transceiver 100 may generate first parity data 620 including restoration information for the first source data 610. The first transceiver 100 may transmit the first parity data 620 to the second transceiver 400 via the first relay device 200 and the second relay device 300. The first parity data 620 may include a parity data set 621 and a plurality of parity data segments 622, 623, 624, and 625.

At least one data segment among the source data segments included in the first source data 610 and the parity data segments included in the first parity data 620 may be lost before the second transceiver 400 receives the first source data 610 and the first parity data 620. Referring to FIG. 6, data segments 640 that are lost may include the three first source data segments 614, 616, and 618, the parity data set 621, and the three parity data segments 622, 623, and 624.

The second transceiver 400 may predict the quantity of the other data segments that have yet to be received, based on the data segment 624 that is lastly received among received at least one data segment of, for example, the data segments 612 and 624. For example, the second transceiver 400 may predict that the quantity of the other data segment(s) 625 is '1', based on an ID number of the lastly received data segment 624.

According to an exemplary embodiment, if the second transceiver 400 determines that the first source data 610 cannot be obtained even when the other data segment 625 is received, the second transceiver 400 may transmit a NACK signal 640 representing that the first source data 610 cannot be obtained to the first transceiver 100. Also, the second transceiver 400 may transmit, to the first transceiver 100, information regarding the quantity of additional data segments required to obtain the first source data 610, together with the NACK signal 640.

When receiving the NACK signal 640 from the second transceiver 400, the first transceiver 100 may transmit the additional data segments required to obtain the first source data 610 to the second transceiver 400. The NACK signal 640 may include information regarding source data segments that are not received by the second transceiver 400. The first transceiver 100 may retransmit the source data segments specified in the information regarding source data segments that are not received. Also, the first transceiver 100 may transmit parity data segments including restoration information for the specified source data segments to the second transceiver 400.

Figure 7:
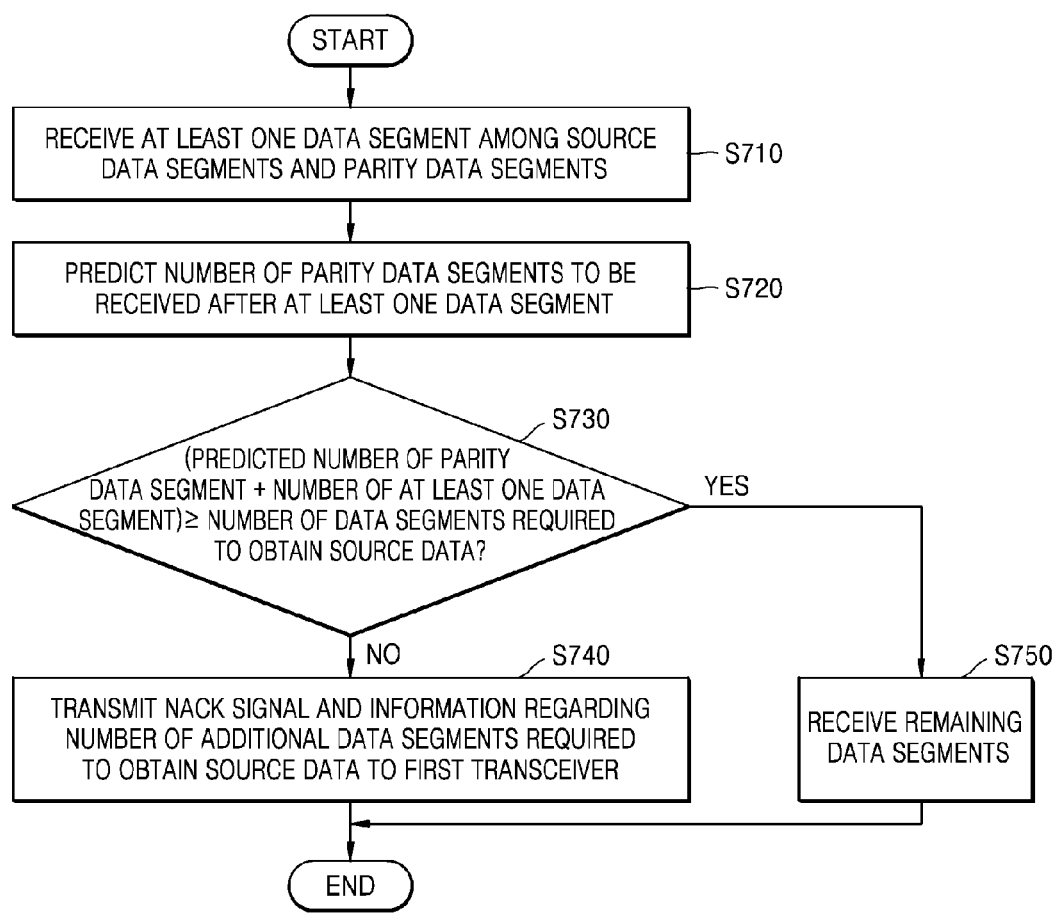
FIG. 7 is a flowchart of a method of determining whether source data is obtained, based on at least one segment received from a transmission device, the method performed by a second transceiver, according to an exemplary embodiment.

FIG. 7 is a flowchart of a method of determining whether source data is obtained, based on at least one segment received from a first transceiver, the method performed by a second transceiver, according to an exemplary embodiment.

Referring to FIGS. 1 and 7, in operation S710, the second transceiver 400 may receive at least one data segment among source data segments included in source data and parity data segments regarding the source data from the first transceiver 100.

According to an exemplary embodiment, the second transceiver 400 may receive at least one data segment among the source data segments and the parity data segments via at least one relay device (e.g., a relay device 200) between the second transceiver 400 and the first transceiver 100 according to the multi-hop method.

In operation S720, the second transceiver 400 may identify the received at least one data segment, and predict the quantity of parity data segments to be received after the received at least one data segment.

In the second transceiver 400, information regarding the quantity of at least one source data segment and the quantity of at least one parity segment to be transmitted from the first transceiver 100 may be stored beforehand. Also, ID numbers may be respectively assigned to the at least one source data segment and the at least one parity segment to be transmitted from the first transceiver 100.

According to an exemplary embodiment, the second transceiver 400 may predict the quantity of parity data segments that have yet to be received among all of the parity data segments transmitted from the first transceiver 100, based on the ID quantity of a parity data segment received lastly. For example, the quantity of all of the parity data segments transmitted from the first transceiver 100 may be four, and '1' to '4' may be respectively assigned as ID numbers to the parity data segments. When the ID number of a parity data segment lastly received is '3', the second transceiver 400 may identify that the quantity of the remaining parity data segment that has yet to be received is one.

In operation S730, the second transceiver 400 may compare the predicted quantity of the parity data segments and the quantity of the received at least one data segment with the quantity of data segments required to obtain the source data.

In the second transceiver 400, information regarding the quantity of data segments required to obtain the source data may be stored. For example, the second transceiver 400 may receive four or more source data segments from the first transceiver 400 so as to obtain source data including four source data segments. Here, the four or more data segments may include all of the source data segments and the parity data segments.

In operation S740, the second transceiver 400 may transmit the NACK signal and information regarding the quantity of additional data segments required to obtain the source data to the first transceiver 100.

According to an exemplary embodiment, the second transceiver 400 may determine that the source data cannot be obtained when the sum of the quantity of the received data segments and the quantity of the remaining data segments is less than the quantity of data segments required to obtain the source data. When it is determined that the source data cannot be obtained, the second transceiver 400 may transmit the NACK signal and information regarding the quantity of additional data segments required to obtain the source data to the first transceiver 100.

However, exemplary embodiments are not limited thereto, and the second transceiver 400 may transmit either the NACK signal or the information regarding the quantity of additional data segments required to obtain the source data to the first transceiver 100.

In operation S750, the second transceiver 400 may receive the remaining data segments from the first transceiver 100.

The second transceiver 400 may determine that the source data may be obtained when the sum of the quantity of the received data segments and the quantity of the remaining data segments is equal to or greater than the quantity of data segments required to obtain the source data. When it is determined that the source data may be obtained, the second transceiver 400 may receive the remaining data segments from the first transceiver 100.

Figure 8:
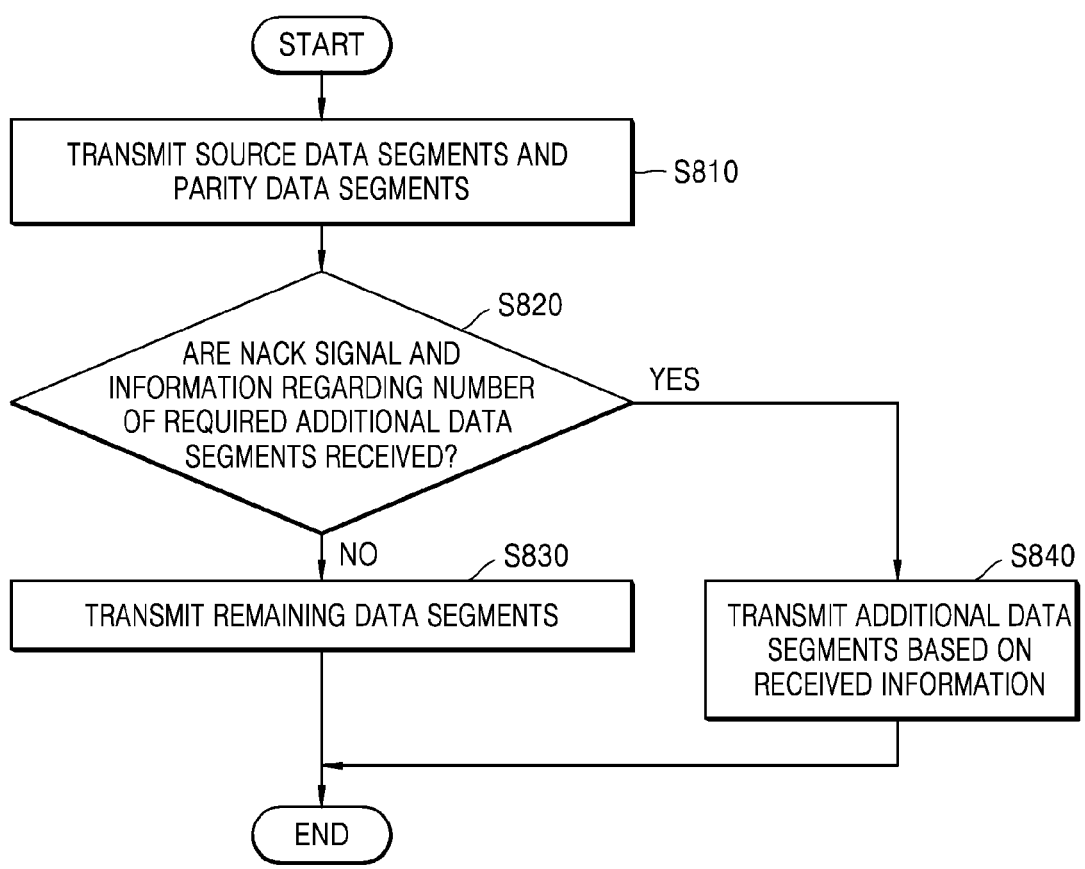
FIG. 8 is a flowchart of a method of transmitting additional data segments from a transmission device to a second transceiver when the transmission device receives a NACK signal from the second transceiver according to an exemplary embodiment.

FIG. 8 is a flowchart of a method of transmitting additional data segments from a first transceiver to a second transceiver when the first transceiver receives the NACK signal from the second transceiver according to an exemplary embodiment.

Referring to FIGS. 1 and 8, in operation S810, the first transceiver 100 may transmit source data segments included in source data and parity data segments including restoration information for the source data to the second transceiver 400.

According to an exemplary embodiment, the first transceiver 100 may transmit at least one data segment among the source data segments and the parity data segments to the second transceiver 400 via at least one relay device (e.g., the relay device 200) between the first transceiver 100 and the second transceiver 400 according to the multi-hop method.

In operation S820, the first transceiver 100 may determine whether the NACK signal and information regarding a quantity of additional data segments required to obtain the source data are received from the second transceiver 400.

Here, the NACK signal and the information regarding the additional data segments may be received from the second transceiver 400 when the second transceiver 400 determines based on the received at least one data segment that the source data is difficult to obtain.

In operation S830, the first transceiver 100 may transmit the remaining data segments that have yet to be transmitted to the second transceiver 400. When the first transceiver 100 does not receive the NACK signal and the information regarding the additional data segments from the second transceiver 400, the first transceiver 100 may transmit the remaining data segments that have yet to be transmitted to the second transceiver 400.

In operation S840, the first transceiver 100 may transmit additional data segments to the second transceiver 400 based on the received information regarding the quantity of the additional data segments.

According to an exemplary embodiment, when the first transceiver 100 receives the NACK signal and the information regarding the additional data segments from the second transceiver 400, the first transceiver 100 may transmit the additional data segments to the second transceiver 400. For example, when the transmission device 100 receives information indicating that three data segments are required to obtain the source data, the first transceiver 100 may transmit the three additional data segments to the second transceiver 400.

Figure 9:
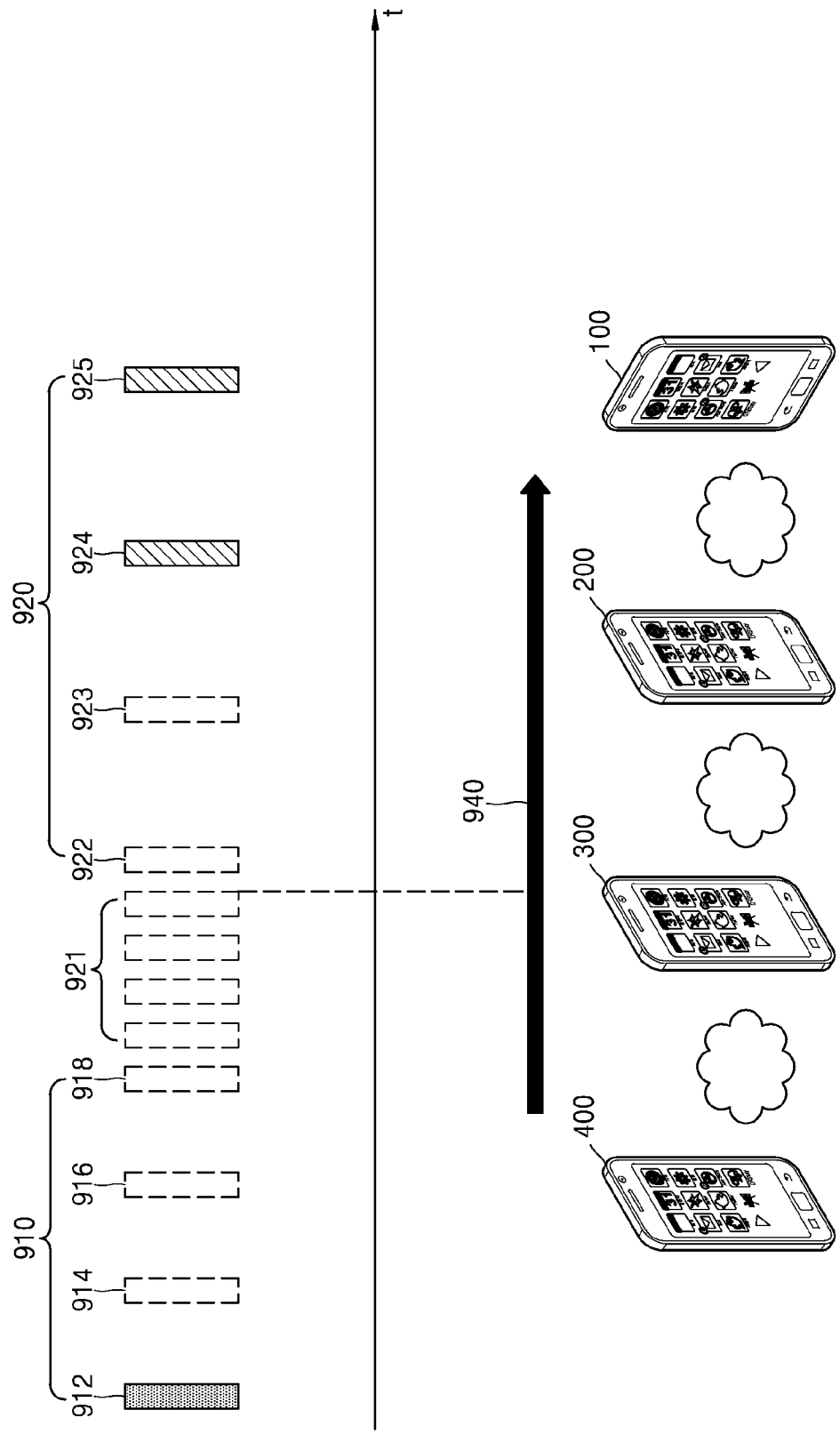
FIG. 9 is a diagram illustrating a method of requesting a transmission device to provide additional data segments by predicting a point of time when the additional data segments are to be received, the method performed by a second transceiver, according to an exemplary embodiment.

FIG. 9 is a diagram illustrating a method of requesting a first transceiver 100 to provide additional data segments by predicting a point of time when the additional data segments are to be received, the method performed by a second transceiver 400, according to an exemplary embodiment.

Referring to FIG. 9, the first transceiver 100 may transmit first source data 910 to the second transceiver 400 via a first relay device 200 and a and second relay device 300 according to the multi-hop method. For example, the first source data 910 may be transmitted from the first transceiver 100 to the second transceiver 400 via the first relay device 200 and the second relay device 300. The first source data 910 may include a plurality of first source data segments 912, 914, 916, and 918.

The first transceiver 100 may generate first parity data 920 including restoration information for the first source data 910. The first transceiver 100 may transmit the first parity data 920 to the second transceiver 400 via the first relay device 200 and the second relay device 300. The first parity data 920 may include a parity data set 921 and a plurality of parity data segments 922, 923, 924, and 925.

According to an exemplary embodiment, the second transceiver 400 may predict a point of time at which subsequent data segments will be received, based on ID information of at least one data segment among the received data segments, e.g., the data segments 912 and 918, and a point of time at which the data segments 912 and 918 are received. Also, the second transceiver 400 may predict a point of time at which a specific data segment will be received. For example, the second transceiver 400 may predict a point of time at which the parity data set 921 transmitted after the transmission of the source data is to be received, based on an ID quantity of the source data segment 918 received lastly.

When the data segments are not received at the predicted point of time, the second transceiver 400 may transmit a request 940 for additional data segments required to obtain the source data to the first transceiver 100. The request 940 for the additional data segment may include information regarding the quantity of the additional data segments required to obtain the source data. For example, when the parity data set 921 is not received at the predicted point of time, the second transceiver 400 may transmit the request 940 for the additional data segments to the first transceiver 100.

The second transceiver 400 may predict a point of time at which a subsequent data segment to be received, and request the first transceiver 100 to provide the additional data segment when the subsequent data segment is not received at the predicted point of time.

Figure 10:
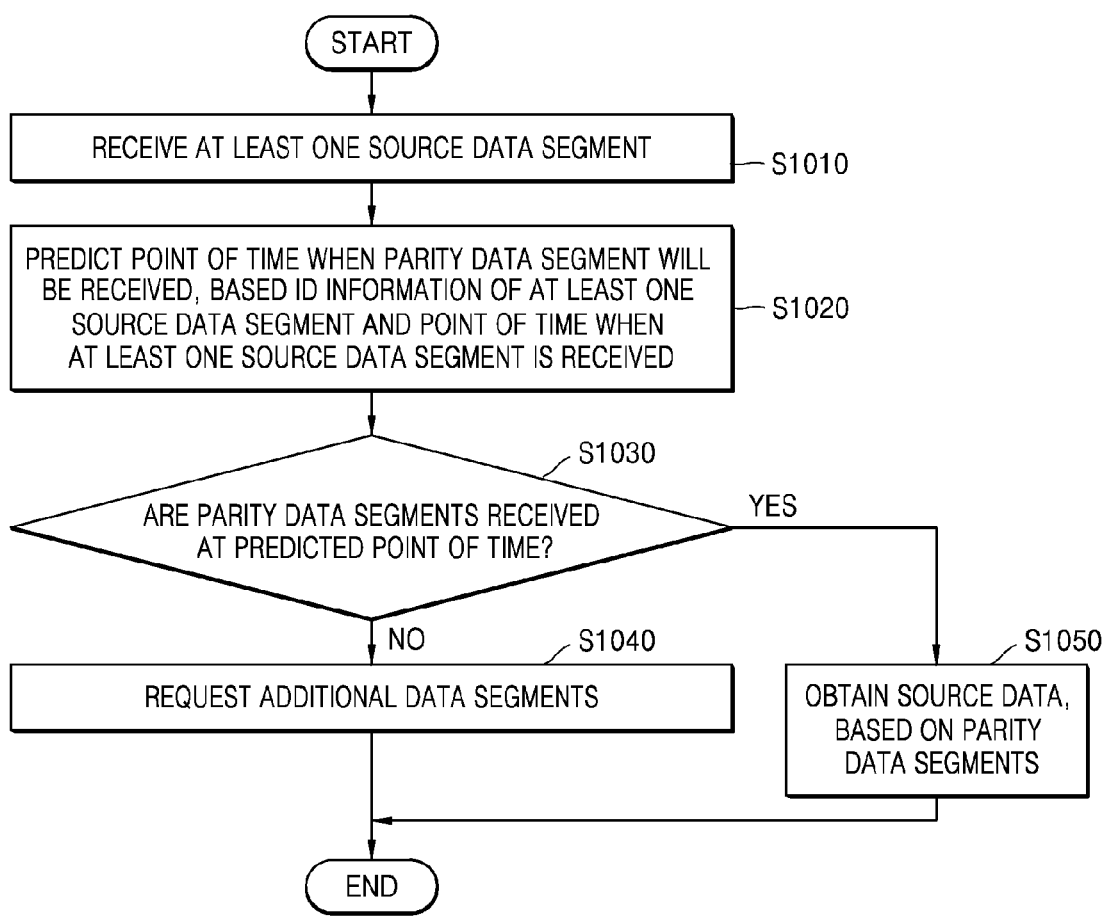
FIG. 10 is a flowchart of a method of requesting a first transceiver to provide additional data segments by predicting a point of time when the additional data segments are to be received, the method performed by a second transceiver, according to an exemplary embodiment.

FIG. 10 is a flowchart of a method of requesting a first transceiver to provide additional data segments by predicting a point of time when the additional data segments are to be received, the method performed by a second transceiver, according to an exemplary embodiment.

Referring to FIGS. 1 and 10, in operation S1010, the second transceiver 400 may receive at least one source data segment among a plurality of source data segments included in source data.

According to an exemplary embodiment, the second transceiver 400 may receive the at least one source data segment via at least one relay device (e.g., the relay device 200) between the second transceiver 400 and the first transceiver 100 according to the multi-hop method.

In operation S1020, the second transceiver 400 may predict a point of time at which parity data segments will be received, based ID information of the at least one source data segment and the point of time at which the at least one source data segment is received.

According to an exemplary embodiment, the second transceiver 400 may predict time intervals at which data segments will be transmitted from the first transceiver 100, based the ID information of the at least one source data segment and the point of time at which the at least one source data segment is received.

The second transceiver 400 may predict a point of time at which parity data segments will be received, based on the predicted time intervals.

In operation S1030, the second transceiver 400 may determine whether the parity data segments are received at the predicted point of time. For example, the second transceiver 400 may determine whether a parity data set is received at the predicted point of time.

In operation S1040, the second transceiver 400 may request the first transceiver 100 to provide additional data segments. When the parity data segments are not received at the predicted point of time, the second transceiver 400 may request the first transceiver 100 to provide the additional data segments.

In operation S1050, the second transceiver 400 may obtain the source data, based on the received parity data segments. The second transceiver 400 may obtain the source data from the received parity data segments and the received source data segments.

FIG. 11 is a diagram illustrating a method of changing a data segment transmission section by receiving information regarding a data loss section from a second transceiver 400, the method performed by a first transceiver 100, according to an exemplary embodiment.

Referring to FIG. 11A, the first transceiver 100 may transmit first source data 1110 to the second transceiver 400 via a first relay device 200 and a second relay device 300 according to the multi-hop method. For example, the first source data 1110 may be transmitted from the first transceiver 100 to the second transceiver 400 via the first and second relay devices 200 and 300. The first source data 1110 may include a plurality of first source data segments 1112, 1114, 1116, and 1118.

The first transceiver 100 may generate first parity data 1120 including restoration information for the first source data 1110. The first transceiver 100 may transmit the first parity data 1120 to the second transceiver 400 via the first and second relay devices 200 and 300. The first parity data 1120 may include a parity data set 1121, and a plurality of first parity data segments 1122, 1123, 1124, and 1125.

Consecutive data loss sections may occur between the first transceiver 100 and the second transceiver 400 in a network. In this case, a data transmission section 1130 corresponds to the consecutive data loss sections. Thus, at least one data segment transmitted from the first transceiver 100 may be continuously lost. For example, referring to FIG. 11A, three first source data segments 1114, 1116, and 1118, a parity data set 1121, and two parity data segments 1122 and 1124 may be lost in the consecutive data loss sections between the first transceiver 100 and the second transceiver 400.

Referring to FIG. 11B, the first transceiver 100 may transmit second source data 1140 to the second transceiver 400 via the first and second relay devices 200 and 300 according to the multi-chip method. The second source data 1140 may include a plurality of second source data segments 1142, 1144, 1146, and 1148.

The first transceiver 100 may also transmit second parity data 1150 to the second transceiver 400 via the first relay device 200 and the second relay device 300. The second parity data 1150 may include a parity data set 1151 and a plurality of second parity data segments 1152, 1153, 1154, and 1155.

According to an exemplary embodiment, the second transceiver 400 may predict a data loss section in a network, based on received at least one data segment. The second transceiver 400 may transmit information regarding the predicted data loss section to the first transceiver 100.

The first transceiver 100 may change a transmission section for transmitting different data segments to the second transceiver 400, based on the information regarding the predicted data loss section received from the second transceiver 400. Referring to FIG. 11B, the first transceiver 100 may transmit different data segments 1154, 1156, and 1158 to the second transceiver 400, based on a changed data transmission section 1170, thereby preventing a loss in the different data segments 1154, 1156, and 1158.

Figure 12:
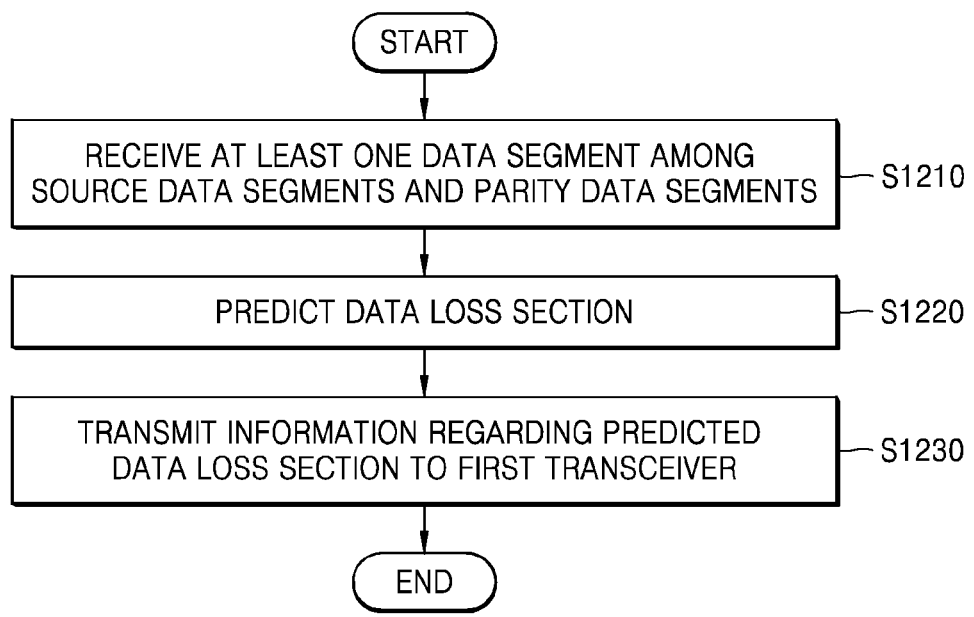
FIG. 12 is a flowchart of a method of transmitting information regarding a data loss section from a second transceiver to a first transceiver, according to an exemplary embodiment.

FIG. 12 is a flowchart of a method of transmitting information regarding a data loss section from a second transceiver to a first transceiver according to an exemplary embodiment.

Referring to FIGS. 1 and 12, in operation S1210, the second transceiver 400 may receive at least one data segment among source data segments included in source data and parity data segments regarding the source data from the first transceiver 100.

Operation S1210 may correspond to operation S710 described above with reference to FIG. 7.

In operation S1220, the second transceiver 400 may predict a data loss section between the second transceiver 400 and the first transceiver 100, based on information regarding a point of time at which the received at least one data segment is received.

For example, the second transceiver 400 may detect an ID number of the received at least one data segment. Also, the second transceiver 400 may predict at least one of the quantity of data segments lost for a predetermined time and a data loss section in which a data segment is lost, based on the information regarding a point of time at which the received at least one data segment is received.

In operation S1230, the second transceiver 400 may transmit information indicating the predicted data loss section to the first transceiver 100.

According to an exemplary embodiment, the second transceiver 400 may transmit the information indicating the predicted data loss section to the first transceiver 100 via a path that is substantially the same as a path over which the at least one data is received. According to another exemplary embodiment, the second transceiver 400 may transmit the information regarding the predicted data loss section to the first transceiver 100 via a path that is different from the path over which the at least one data is received.

Figure 13:
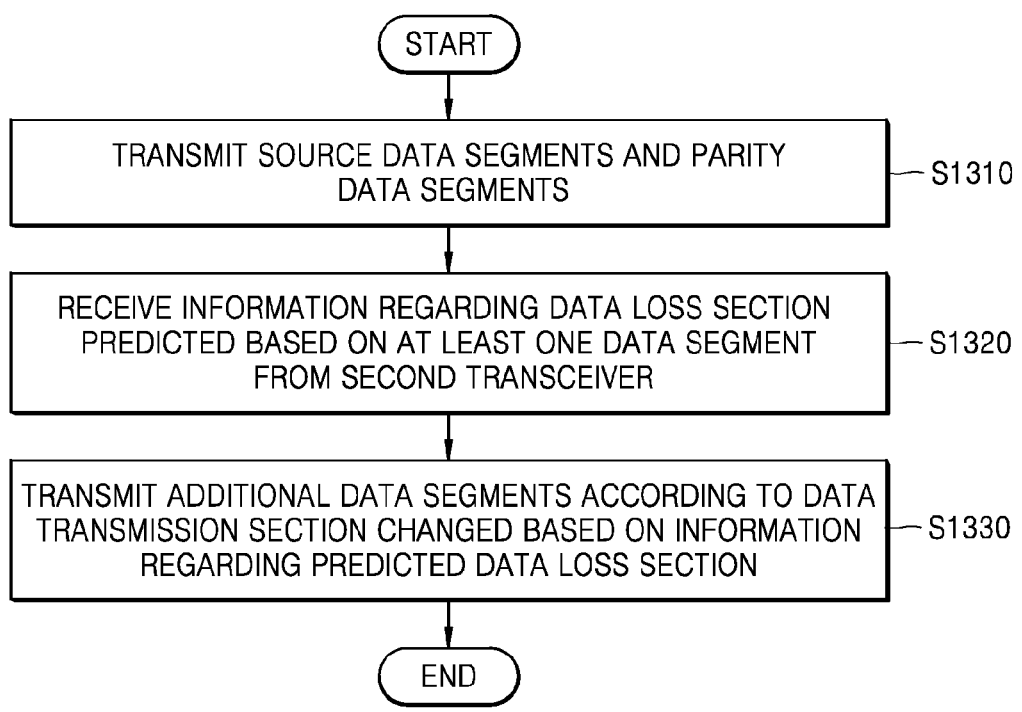
FIG. 13 is a flowchart of a method of changing a transmission section, based on information regarding a data loss section received from a second transceiver, the method performed by a first transceiver, according to an exemplary embodiment.

FIG. 13 is a flowchart of a method of changing a transmission section, based on information regarding a data loss section received from a second transceiver, the method performed by a first transceiver, according to an exemplary embodiment.

Referring to FIGS. 1 and 13, in operation S1310, the first transceiver 100 may transmit source data segments included in source data and parity data segments including restoration information for the source data to the second transceiver 400.

Operation S1310 may correspond to operation S810 as described above with reference to FIG. 8.

In operation S1320, the first transceiver 100 may receive, from the second transceiver 400, information regarding a data loss section predicted based on at least one data segment received by the second transceiver 400 among the transmitted source data segments and parity data segments.

In operation S1330, the first transceiver 100 may transmit additional data segments according to a data transmission section changed based on the predicted data loss section.

According to an exemplary embodiment, the first transceiver 100 may change a preset data transmission section based on the information regarding the predicted data loss section. For example, when the preset data transmission section corresponds to the predicted data loss section, the first transceiver 100 may change the data transmission section to be wider than the predicted data loss section. When the preset data transmission section has a width of 'a' and the predicted data loss section has a width of '1.2a,' the first transceiver 100 may change the data transmission section to have a width of '1.5a.'

Also, the first transceiver 100 may transmit additional data segments to the second transceiver 400 according to the changed data transmission section.

Figure 14:
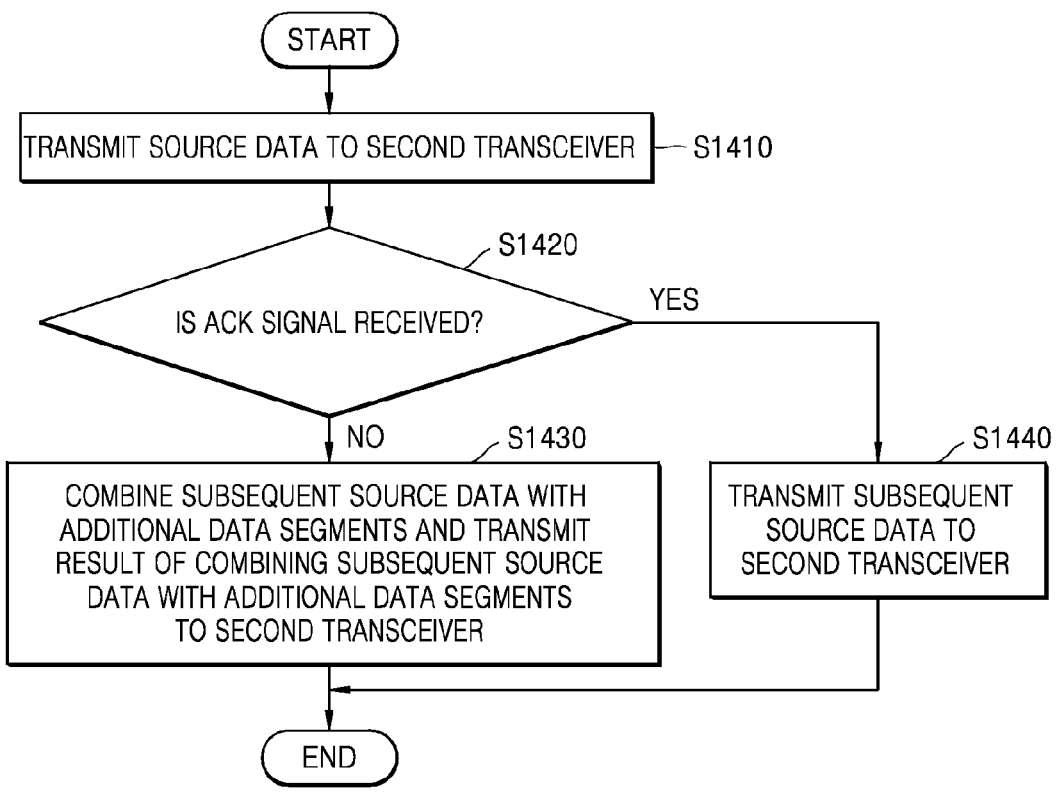
FIG. 14 is a flowchart of a method of discontinuing combining parity data of source data with subsequent source data according to an ACK signal received from a second transceiver, the method performed by a first transceiver, according to an exemplary embodiment.

FIG. 14 is a flowchart of a method of discontinuing combining parity data of source data with subsequent source data according to an ACK signal received from a second transceiver, the method performed by a first transceiver, according to an exemplary embodiment.

Referring to FIGS. 1 and 14, in operation S1410, the first transceiver 100 may transmit source data to the second transceiver 400. The first transceiver 100 may transmit the source data to the second transceiver 400 via at least one among the relay devices 200 and 300 according to the multi-chip method.

In operation S1420, the first transceiver 100 may determine whether the ACK signal is received. The ACK signal may be transmitted from the second transceiver 400 to the first transceiver 100 when the second transceiver 400 receives the source data.

In operation S1430, the first transceiver 100 may combine source data subsequent to the source data with additional data segments, and transmit a result of combining the subsequent source data with the additional data segments to the second transceiver 400.

According to an exemplary embodiment, when the first transceiver 100 does not receive the ACK signal, the first transceiver 100 may combine additional data segments required to obtain the source data with the subsequent source data, and transmit a result of combining the required additional data segments with the subsequent source data to the second transceiver 400.

In operation S1440, the first transceiver 100 may transmit the subsequent source data to the second transceiver 400.

According to an exemplary embodiment, when the first transceiver 100 receives the ACK signal, the first transceiver 100 may transmit the subsequent source data to the second transceiver 400. When the first transceiver 100 receives the ACK signal, the first transceiver 100 may determine that the second transceiver 400 obtains the source data and may thus not transmit the additional data segments required to obtain the source data to the second transceiver 400.

Figure 15:
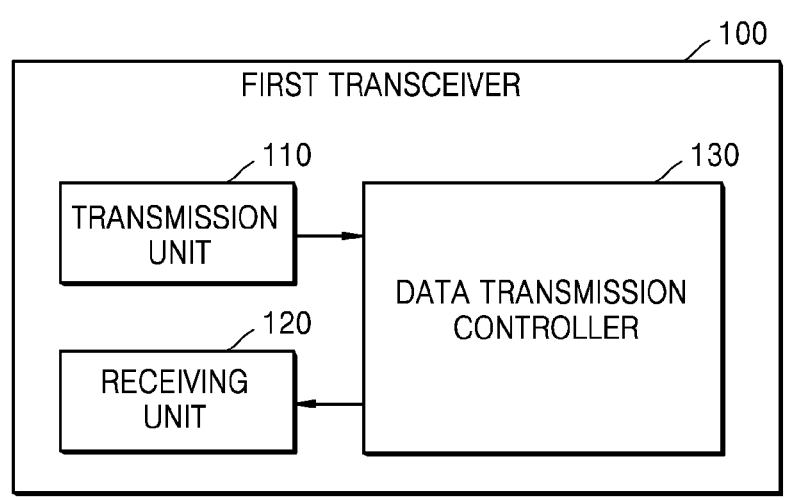
FIG. 15 is a block diagram of a first transceiver according to an exemplary embodiment.

FIG. 15 is a block diagram of a first transceiver 100 according to an exemplary embodiment.

Referring to FIG. 15, the first transceiver 100 may include a transmission unit 110, a receiving unit 120, and a data transmission controller 130.

FIG. 15 illustrates only components of the first transceiver 100 that are related to the present embodiment, but those of ordinary skill in the art will understand that the first transceiver 100 may include other components.

Referring to FIGS. 1 and 15, the transmission unit 110 transmits source data segments included in source data and parity data segments including restoration information for the source data to the second transceiver 400.

The receiving unit 120 receives from the second transceiver 400 a control signal indicating whether the source data is obtained, the control signal determined based on at least one data segment among the source data segments and the parity data segments.

The receiving unit 120 may receive the ACK signal when the second transceiver 400 may obtain the source data based on the received at least one data segment.

The receiving unit 120 may receive the NACK signal when the second transceiver 400 cannot obtain the source data based on the received at least one data segment. Also, when the second transceiver 400 cannot obtain the source data, the receiving unit 120 may receive information regarding the quantity of additional data segments required to obtain the source data. As another example, the receiving unit 120 may receive information regarding a data loss section in which the source data is damaged from the second transceiver 400.

The data transmission controller 130 determines whether the additional data segments required to obtain the source data are to be transmitted, based on the received control signal 40.

When an ACK signal including information indicating that the source data may be obtained is received from the second transceiver 400, the data transmission controller 130 may control the transmission unit 110 to discontinue transmission of the additional data segments. The additional data segments may include at least one among the source data segments that constitute the source data and the parity data segments that constitute parity data.

When a NACK signal including information representing that the source data cannot be obtained is received from the second transceiver 400, the data transmission controller 130 may control the transmission unit 110 to transmit the additional data segments to the second transceiver 400. Also, the data transmission controller 130 may control the transmission unit 110 to transmit the additional data segments to the second transceiver 400, based on the information regarding the quantity of the required additional data segments. As another example, the data transmission controller 130 may control a time period for which the transmission unit 110 will transmit the additional data segments to the second transceiver 400.

The data transmission controller 130 may determine a point of time at which a parity data set including a plurality of parity data segments will be transmitted to be a point of time after a data round-trip time between the first transceiver 100 and the second transceiver 400, starting from a point of time at which the transmission of the source data is completed.

Also, the data transmission controller 130 may change a transmission section in which the additional data segments are to be transmitted to the second transceiver 400, based on information regarding a data loss section received by the receiving unit 120.

According to an exemplary embodiment, when the receiving unit 120 receives the NACK signal, the data transmission controller 130 may discontinue combining the parity data segments including the restoration information for the source data with source data segments included in subsequent source data.

According to an exemplary embodiment, the first transceiver 100 may include a data encoder configured to generate the source data segments and the parity data segment.

Figure 16:
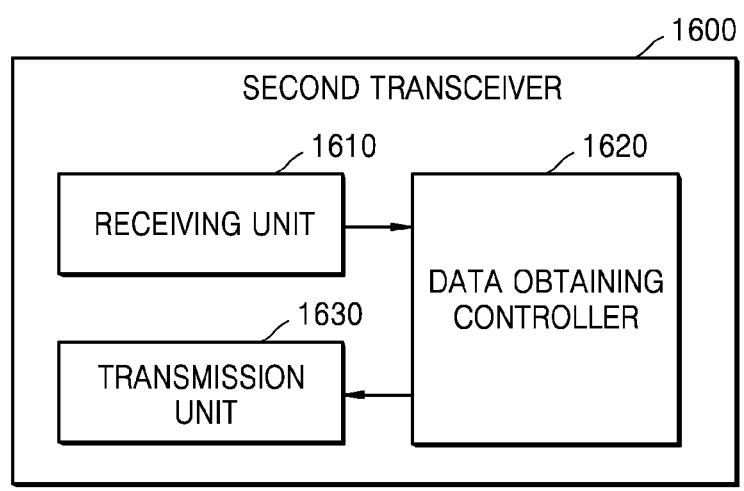
FIG. 16 is a block diagram of a second transceiver according to an exemplary embodiment.

FIG. 16 is a block diagram of a second transceiver according to an exemplary embodiment.

Referring to FIG. 16, the second transceiver 1600 may include a receiving unit 1610, a data obtaining controller 1620, and a transmission unit 1630. The second transceiver 1600 may correspond to the second transceiver 400 discussed above.

FIG. 16 illustrates only components of the second transceiver 1600 that are related to the present embodiment but it would be apparent to those of ordinary skill in the art that the second transceiver 1600 may further include other general components.

Referring to FIGS. 1 and 16, the receiving unit 1610 receives from the first transceiver 100 at least one data segment among source data segments included in source data and parity data segments including restoration information for the source data. The receiving unit 1610 may receive at least one data segment that is not damaged by a change in a network environment, e.g., a change in a routing path or channel interference, among the source data segment and the parity data segments transmitted from the first transceiver 100.

The data obtaining controller 1620 determines whether the source data may be obtained, based on the received at least one data segment.

According to an exemplary embodiment, the data obtaining controller 420 may compare the quantity of the received at least one data segment with the quantity of data segments required to obtain the source data. The data obtaining controller 1620 may determine that the source data may be obtained when the quantity of the received at least one data segment is equal to or greater than the quantity of data segments required to obtain the source data.

Also, the data obtaining controller 1620 may predict a point of time at which the parity data segments will be received, based on ID information of the received at least one source data segment and a point of time at which the received at least one source data segment is received. When the parity data segments are not received at the predicted point of time, the data obtaining controller 1620 may control the transmission unit 1630 to request the first transceiver 100 to provide additional data segments to obtain the source data.

The transmission unit 1630 transmits a control signal representing whether the source data is obtained to the first transceiver 100 that transmits the source data, based on the determination of the data obtaining controller 1620. For example, when the data obtaining controller 1620 determines that the source data may be obtained, based on the received at least one data segment, the transmission unit 1630 may transmit the ACK signal to the first transceiver 100. When the data obtaining controller 1620 determines that the source data cannot be obtained, based on the received at least one data segment, the transmission unit 1630 may transmit the NACK signal to the first transceiver 100. Also, when the data obtaining controller 1620 determines that the source data cannot be obtained, based on the received at least one data segment, the transmission unit 1630 may transmit, as a control signal, information regarding the quantity of additional data segments required to obtain the source data to the first transceiver 100.

Also, the transmission unit 1630 may transmit, as a control signal, information indicating a predicted data loss section to the first transceiver 100. The data loss section may be predicted by the data obtaining controller 1620, based on an ID quantity assigned to the at least one data segment received by the receiving unit 1610.

According to an exemplary embodiment, the second transceiver 1600 may include a data decoder configured to decode received source data segments and parity data segments.

The devices or apparatuses according to the exemplary embodiments set forth herein may include a processor, a memory for storing and executing program data, a permanent storage such as a disk drive, a communication port for communicating with an external device, a user interface device such as a touch panel, keys, buttons, etc. Methods that may be embodied as software modules or algorithms may be stored in a computer readable recording medium in the form of computer readable codes or program instructions that can be executed in the processor. Examples of the computer readable recording medium include a magnetic recording medium (e.g., read-only memory (ROM), random-access memory (RAM), a floppy disk, a hard disc, etc.), an optical recording medium (e.g., compact-disk ROM (CD-ROM), a digital versatile disc ((DVD)), and so on. The computer readable medium can be distributed among computer systems that are interconnected through a network, and exemplary embodiments may be stored and implemented as computer readable code in a distribution manner. The computer readable recording medium can be read by a computer, stored in a memory, and executed by a processor.

All references including publications, patent applications, and patents, cited herein, are hereby incorporated by reference to the same extent as if each reference were individually and specifically indicated to be incorporated by reference and were set forth in its entirety herein.

To help understand the exemplary embodiments set forth herein, reference numerals are used in the exemplary embodiments illustrated in the drawings and specific terms are used to explain these embodiments. However, the exemplary embodiments not limited by the specific terms. The exemplary embodiments may cover all components that are obvious to those of ordinary skill in the art.

The exemplary embodiments set forth herein may be represented using functional block components and various operations. Such functional blocks may be realized by any number of hardware and/or software components configured to perform specified functions. For example, the exemplary embodiments may employ various integrated circuit components, e.g., memory, processing elements, logic elements, look-up tables, and the like, which may carry out a variety of functions under control of at least one microprocessor or other control devices. As the elements of the exemplary embodiments are implemented using software programming or software elements, the exemplary embodiments may be implemented with any programming or scripting language such as C, C++, Java, assembler, or the like, including various algorithms that are any combination of data structures, processes, routines or other programming elements. Functional aspects may be realized as an algorithm executed by at least one processor. Furthermore, the exemplary embodiments may employ conventional techniques for electronics configuration, signal processing and/or data processing. The terms 'mechanism', 'element', 'means', 'configuration', etc. are used broadly and are not limited to mechanical or physical embodiments. These terms should be understood as including software routines in conjunction with processors, etc.

The particular implementations shown and described herein are exemplary embodiments and are not intended to otherwise limit the scope of the inventive concept in any way. For the sake of brevity, conventional electronics, control systems, software development and other functional aspects of the systems may not be described in detail. Furthermore, the lines or connecting elements shown in the appended drawings are intended to represent exemplary functional relationships and/or physical or logical couplings between the various elements. It should be noted that many alternative or additional functional relationships, physical connections or logical connections may be present in a practical device. Moreover, no item or component is essential to the practice of the inventive concept unless it is specifically described as "essential" or "critical".

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A method of transmitting data, performed by a first transceiver, the method comprising:
    generating parity data segments comprising restoration information for restoring a first source data;
    transmitting data segments of the first source data and at least one first parity data segment among the parity data segments to a second transceiver;
    receiving from the second transceiver a first control signal for requesting to prevent transmitting a second parity data segment among the parity data segments, when the first source data is obtained by the second receiver based on the transmitted data segments and the at least one first parity data segment;
    preventing the transmission of the second parity data segment according to the received first control signal; and
    transmitting data segments of a second source data and at least one second parity data segment comprising restoration information for restoring the second source data.

2. The method of claim 1, wherein a point of time at which a parity data set including a plurality of parity data segments is to be transmitted is determined to be a point of time after a data round-trip time between the first transceiver and the second transceiver, starting from a point of time at which the transmitting of the first source data is completed.

3. The method of claim 1, further comprising:
    receiving a second control signal for requesting to provide additional data segments, when the first source data is not obtained by the second receiver, and
    transmitting the additional data segments according to the received second control signal.

4. The method of claim 3, wherein said receiving comprises receiving, from the second transceiver, information indicating a quantity of the additional data segments for the second transceiver to obtain the first source data, and said transmitting the additional data segments comprises transmitting the additional data segments, based on the information indicating the quantity of the additional data segments.

5. The method of claim 3, further comprising:
    receiving information indicating a data loss section predicted by the second transceiver based on the additional data segment, from the second transceiver; and
    changing a transmission section in which the additional data segments are to be transmitted, based on the information indicating the predicted data loss section.

6. The method of claim 1, further comprising:
    when the first source data is obtained by the second receiver, stopping to combine the second parity data segment and at least one data segment of the second source data, and
    when the first source data is not obtained by the second receiver, transmitting the second parity data segment combined with the at least one data segment of the second source data.

7. A non-transitory computer-readable recording medium having recorded thereon a program for executing the method of claim 1.

8. A method of transmitting and receiving data, performed by a receiving transceiver, the method comprising:
    receiving at least one first data segment among data segments of a first source data and at least one first parity data segment among a plurality of parity data segments including restoration information for restoring the first source data, from a transmitting transceiver;
    determining whether the first source data is obtained based on the received at least one first data segment and the at least one first parity data segment; and
    when the first source data is obtained, transmitting a first control signal for requesting to prevent transmitting a second parity data segment among the plurality of parity data segments.

9. The method of claim 8, further comprising:
    identifying the at least one first data segment;
    predicting a quantity of second parity data segments to be received after the identified at least one first data segment;

comparing the predicted quantity of the second parity data segments and a quantity of the identified at least one first data segment with a quantity of data segments required to obtain the first source data; and when the predicted quantity of the second parity data segments to be additionally received is less than the quantity of the required data segments, requesting second data segments for obtaining the first source data, based on the comparison, by transmitting a second control signal to the transmitting transceiver.

10. The method of claim 9, wherein said requesting comprises obtaining information indicating the quantity of the second data segments required to obtain the first source data.

11. The method of claim 8, further comprising:
predicting a point of time at which a parity data segment are to be received, based on identification information of the received at least one first data segment and a point of time at which the at least one first data segment is received;
determining whether the parity data segment is not received at the predicted point of time, and
requesting additional data segments for obtaining the first source data when the parity data segment is not received at the predicted point of time, by transmitting a second control signal to the transmitting transceiver.

12. The method of claim 8, further comprising:
predicting a data loss section, based on information regarding a point of time at which at least one data segment is received; and
transmitting information regarding the predicted data loss section to the first transceiver,
wherein a transmission section in which additional data segments for obtaining the source data are transmitted is determined based on the information indicating the predicted data loss section.

13. A first transceiver for transmitting and receiving data, the first transceiver comprising:
a data transmission controller configured to generate parity data segments comprising restoration information for restoring a first source data;
a transmission unit configured to transmit data segments of the first source data and at least one first parity data segment among the parity data segments, to a second transceiver; and
a receiving unit configured to receive from the second transceiver a first control signal for requesting to prevent transmitting a second parity data segment among the parity data segments, when the first source data is obtained by the second receiver based on the transmitted data segments and the at least one first parity data segment,
wherein the data transmission controller is further configured to prevent the transmission of the second parity data segment according to the received first control signal and
wherein the transmission unit is further configured to transmit data segments of a second source data and at least one second parity data segment comprising restoration information for restoring the second source data.

14. The first transceiver of claim 13, wherein a point of time at which a parity data set including a plurality of parity data segments is to be transmitted is determined after a data round-trip time between the first transceiver and the second transceiver, starting from a point of time at which the transmission of the first source data is completed.

15. The first transceiver of claim 13, wherein
the receiving unit is further configured to receive a second control signal for requesting to provide the additional data segments, when the first source data is not obtained by the second receiver, and
the transmission unit is further configured to transmit the additional data segments according to the second control signal.

16. The first transceiver of claim 15, wherein the receiving unit is further configured to receive information indicating a quantity of the additional data segments for the second transceiver to obtain the first source data, from the second transceiver, and the transmission unit is further configured to transmit the additional data segments, based on the information indicating the quantity of the additional data segments.

17. The first transceiver of claim 15, wherein the receiving unit is further configured to receive information indicating a data loss section predicted based on the additional data segment, from the second transceiver, and
the data transmission controller is further configured to change a transmission section in which the additional data segments are to be transmitted, based on the information indicating the predicted data loss section.

18. The first transceiver of claim 13, wherein, the data transmission controller is further configured to stop combining the second parity data segment and at least one data segment of the second source data when the first source data is obtained by the second receiver and to transmit the second parity data segment combined with the at least one data segment of second source data when the first source data is not obtained by the second receiver.

19. A receiving transceiver for transmitting and receiving data, the receiving transceiver comprising:
a receiving unit configured to receive at least one first data segment among data segments of a first source data and at least one first parity data segment among a plurality of parity data segments comprising restoration information for restoring the first source data, from a transmitting transceiver,
a data obtaining controller configured to determine whether the first source data is obtained, based on the received at least one first data segment and the at least one first parity data segment; and
a transmission unit configured to transmit a first control signal for requesting to prevent transmitting a second parity data segment among the plurality of parity data segments when the first source data is obtained.

20. The second transceiver of claim 19, wherein the data obtaining controller is further configured to identify the at least one first data segment, predict a quantity of second parity data segments to be received after the identified at least one first data segment, and compare a quantity of the predicted second parity data segments and a quantity of the identified at least one first data segment with a quantity of data segments required to obtain the first source data, and
the transmission unit is further configured to request second data segments for obtaining the first source data, based on the comparison, by transmitting a second control signal to the transmitting transceiver, when the predicted quantity of the second parity data segments to be additionally received is less than the quantity of the required data segments.

21. The second transceiver of claim 20, wherein the requesting of the additional data segment comprises obtaining information indicating the second data segments required to obtain the first source data.

22. The second transceiver of claim 19, wherein the data obtaining controller is further configured to predict a point of time at which a parity data segment are to be received, based on identification information of the received at least one first data segment and a point of time at which the at least one first data segment is received and to determine whether the parity data segment is not received at the predicted point of time, and the transmission unit is further configured to request the additional data segments for obtaining the first source data when the parity data segment is not received at the predicted point of time by transmitting a second control signal to the transmitting transceiver.

23. The second transceiver of claim 19, wherein the data obtaining controller is further configured to predict a data loss section, based on a point of time at which the at least one data segment is received, the transmission unit is further configured to transmit information regarding the predicted data loss section to the transmitting transceiver, and a transmission section in which additional data segments for obtaining the source data are transmitted is determined based on the information indicating the predicted data loss section.

\* \* \* \* \*